US008600084B1

(12) United States Patent
Garrett

(10) Patent No.: US 8,600,084 B1
(45) Date of Patent: Dec. 3, 2013

(54) METHODS AND SYSTEMS FOR ALTERING THE SPEAKER ORIENTATION OF A PORTABLE SYSTEM

(75) Inventor: James E. Garrett, Round Rock, TX (US)

(73) Assignee: Motion Computing, Inc., Austin, TX (US)

( * ) Notice: Subject to any disclaimer, the term of this patent is extended or adjusted under 35 U.S.C. 154(b) by 1524 days.

(21) Appl. No.: 10/984,334

(22) Filed: Nov. 9, 2004

(51) Int. Cl.
*H04R 5/02* (2006.01)
*H04R 1/02* (2006.01)
*H02B 1/00* (2006.01)

(52) U.S. Cl.
USPC ............ 381/300; 381/334; 381/306; 381/123

(58) Field of Classification Search
USPC ............. 700/94; 345/156; 381/300, 306, 333, 381/334; 710/303; 715/716
See application file for complete search history.

(56) References Cited

U.S. PATENT DOCUMENTS

| | | | | |
|---|---|---|---|---|
| 5,758,267 | A | 5/1998 | Pinder et al. | |
| 6,535,610 | B1 | 3/2003 | Stewart | |
| 6,597,384 | B1 * | 7/2003 | Harrison | 345/204 |
| 6,993,615 | B2 * | 1/2006 | Falcon | 710/303 |
| 2001/0011993 | A1 | 8/2001 | Saarinen | |
| 2004/0039862 | A1 * | 2/2004 | Hunt et al. | 710/303 |
| 2004/0061995 | A1 * | 4/2004 | McMahon | 361/681 |
| 2005/0055487 | A1 * | 3/2005 | Tanaka et al. | 710/303 |

* cited by examiner

*Primary Examiner* — Jesse Elbin

(74) *Attorney, Agent, or Firm* — Kevin L. Daffer; Daffer McDaniel LLP

(57) ABSTRACT

Computer-implemented methods are provided. One method includes determining an orientation of a display of a portable system. The method also includes altering an orientation of two speakers arranged along one side of the system based on the orientation of the display. Another method includes determining an orientation of a display of a portable system and determining an orientation of two speakers of the system based on the orientation of the display. If a current orientation of the two speakers differs from the determined orientation of the two speakers, the method includes altering the current orientation of the speakers such that they have the determined orientation. A portable system is also provided that includes means for determining an orientation of a display of the system. The system also includes means for altering an orientation of two speakers arranged along one side of the system based on the orientation of the display.

28 Claims, 6 Drawing Sheets

METHODS AND SYSTEMS FOR ALTERING THE SPEAKER ORIENTATION OF A PORTABLE SYSTEM

BACKGROUND OF THE INVENTION

1. Field of the Invention

The present invention generally relates to methods and systems for altering the speaker orientation of a portable system. Certain embodiments relate to computer-implemented methods for altering the speaker orientation of a portable system based on the display orientation of the system.

2. Description of the Related Art

The following descriptions and examples are not admitted to be prior art by virtue of their inclusion within this section.

Portable systems are becoming increasingly popular, and many different types of portable systems are currently available such as portable computer systems including, but not limited to, tablet personal computers (tablet PCs), personal digital assistants (PDAs), and cellular telephones that have capabilities other than telephony. Many types of handheld or portable systems are currently designed such that they can be used in multiple orientations. For example, depending on the data being displayed on the system, a position of a screen and a display orientation of the portable system may be altered to accommodate the data. In other examples, the position of the screen and the display orientation of a portable system may be altered depending on the preference of a user, the task being performed by the user, or an application being used on the system.

In general, the screen and the display may be oriented in a landscape orientation or a portrait orientation. The term "landscape orientation" generally refers to an orientation of a display screen in which the largest lateral dimension is in the substantially horizontal direction. In contrast, the term "portrait orientation" generally refers to an orientation of a display screen in which the largest lateral dimension is in the substantially vertical direction. The terms "horizontal" and "vertical" as used herein are intended to specify a direction with respect to a user and are not intended to convey any other geometrical direction.

Typically, portable systems have internal stereophonic speakers that are used to deliver sound to a user. In stereophonic sound production, two speakers commonly referred to as left and right speakers due to their orientation with respect to the system are each provided with a respective audio signal. The audio signals are configured such that when the left and right speakers are disposed along a stereo baseline with respect to a user, the user experiences sound representative of the source from which the audio signals are created. In other words, the user experiences a spatial audio image.

When using stereo speakers in a portable system, which has the capability of being used in multiple orientations (e.g., in a tablet PC), the speaker "left" and "right" are not adjusted when the orientation of the screen is switched. For example, the "left" speaker may be coupled to a "left" amplifier, and the "right" speaker may be coupled to a "right" amplifier. The amplifiers deliver the "left" and "right" oriented sound to the "left" and "right" speakers, respectively, regardless of the orientation of the display of the portable system. Therefore, the sound intended for the right and left channels will be reversed for some display orientations. Reversal of the sound is primarily a concern when the tablet PC (or another handheld system) display is oriented in the two portrait modes due to the location of the speakers, which are illustrated further below. However, speaker reversal can also be a concern when a handheld system is oriented in the two landscape modes.

Several examples of systems that are configured to switch the orientation of speakers in a portable or movable device are illustrated in U.S. patent application Ser. No. 09/775,357 to Saarinen, which is incorporated by reference as if fully set forth herein. However, many of the system configurations described by Saarinen are undesirable for a number of reasons. For example, Saarinen discloses that a drawback of one known display apparatus is that it requires at least four speakers. In order to operate correctly, the speakers need to be of sufficient size and, consequently, any display apparatus must have a sufficiently large housing in order to incorporate and support the speakers. Thus, the display apparatus housing can become bulky and unattractive. This is a particular problem when the display apparatus is part of a mobile or portable device, for example, a laptop or hand/palm held personal computer or display device, a PDA or a wireless telephone, since the provision of a housing for bulky loudspeakers is inconsistent with the general desire to provide lightweight, low-volume, portable devices.

Saarinen proposes a portable or movable device that includes only three loudspeakers apparently to overcome the drawbacks outlined above. However, the devices proposed by Saarinen may be disadvantageous for other reasons. For example, the three loudspeakers described by Saarinen are located at three corners of the device in a housing surrounding a display screen. Therefore, the lateral dimensions of the housing, and as a result the portable or movable device, are still dictated, at least in part, by the dimensions and requirements of the loudspeakers. In addition, in order to deliver correct stereophonic sound to a user for multiple orientations of the display, the system must turn off one of the diagonally opposite loudspeakers and turn on the other of the diagonally opposite loudspeakers. Furthermore, the system must also switch the orientation of the third loudspeaker. Therefore, the systems solutions described by Saarinen are relatively complex and may be expensive to implement.

Accordingly, it may be desirable to develop a method and a system for altering the orientation of speakers depending on the orientation of a display of a portable system to provide a stereophonic sound image to a user regardless of the display orientation without increasing the size of the housing of the portable system and while keeping the configuration of the system relatively simple and inexpensive.

SUMMARY OF THE INVENTION

An embodiment of the invention relates to a computer-implemented method that includes determining an orientation of a display of a portable system. The method also includes altering an orientation of two speakers arranged along one side of the system based on the orientation of the display. The orientation of the two speakers preferably provides a correct stereo base for the orientation of the display. The system may include a tablet personal computer (tablet PC) or any other portable system known in the art.

In one embodiment, the two speakers are internal speakers of the system. In addition, the two speakers are not external speakers of the system. In this manner, an orientation of the external speakers remains unchanged regardless of the orientation of the display. In some embodiments, the system may include three or more speakers. In one such embodiment, the method may also include performing altering the orientation of the speakers for each of the three or more speakers.

In an embodiment, the system may perform the computer-implemented method automatically. In another embodiment, the system may perform the computer-implemented method upon receipt of input entered manually by a user. In a different embodiment, the system may perform the computer-implemented method upon detecting that the system has been placed into a docking station. The method may include any other steps described herein.

Another embodiment relates to a different computer-implemented method. This method includes determining an orientation of a display of a portable system. The method also includes determining an orientation of two speakers of the system based on the orientation of the display. The two speakers are arranged along one side of the system. In addition, if a current orientation of the two speakers differs from the determined orientation of the two speakers, the method includes altering the current orientation of the speakers such that the two speakers have the determined orientation. The determined orientation of the two speakers preferably corresponds to a correct stereo base for the orientation of the display.

In one embodiment, the two speakers may be internal speakers of the system. In another embodiment, the two speakers are not external speakers of the system. In addition, an orientation of the external speakers remains unchanged regardless of the orientation of the display. In some embodiments, the system may include three or more speakers. In such embodiments, the method may include performing determining the orientation for each of the three or more speakers and altering the current orientation of each of the three or more speakers. This method may also include any other steps described herein.

A different embodiment relates to a portable system. The system includes means for determining an orientation of a display of the system. The system also includes means for altering an orientation of two speakers arranged along one side of the system based on the orientation of the display. The orientation of the display preferably provides a correct stereo base for the orientation of the display. In one embodiment, the system may include a tablet PC or any other portable system known in the art.

In some embodiments, the two speakers are not external speakers of the system. In such embodiments, an orientation of the external speakers remains unchanged regardless of the orientation of the display. In one embodiment, the means for determining the orientation of the display may include means for detecting input entered manually by a user indicating the orientation of the display. In another embodiment, the means for determining the orientation of the display may include means for detecting that the system has been placed into a docking station and means for determining a position of the system in the docking station. The portable system may be further configured as described herein.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
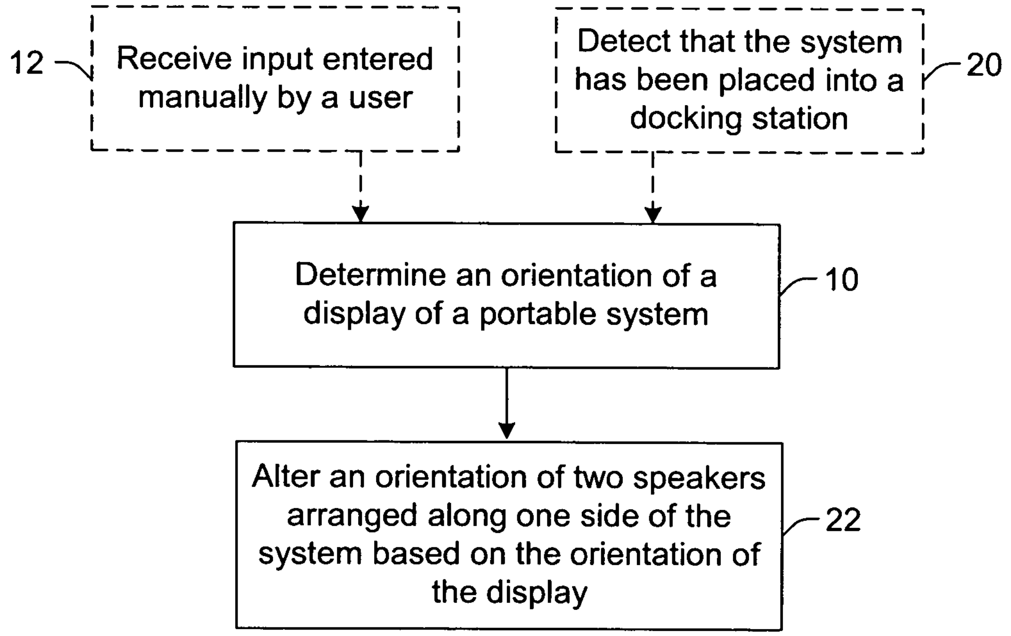
FIG. 1 is a flow chart illustrating one embodiment of a computer-implemented method.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "portable system" generally refers to any system that is portable or at least movable. Examples of such portable systems include tablet personal computers (tablet PCs), which are commercially available from companies including, but not limited to, Motion Computing, Fujitsu, Acer, Toshiba, Compaq, and ViewSonic. However, portable systems may also include personal digital assistants (PDAs), cellular telephones, other portable computers, and portable devices such as personal digital video disc (DVD) players, portable televisions, and any other portable or movable device or system known in the art.

Turning now to the drawings, FIG. 1 illustrates one embodiment of a computer-implemented method for altering the orientation of speakers of a portable system based on the orientation of a display of the portable system. As shown in step 10 of FIG. 1, the method includes determining an orientation of a display of a portable system. Many of the portable systems described herein can have multiple orientations. For example, a tablet PC can be arranged in a landscape orientation or a portrait orientation. In addition, a tablet PC can generally be arranged in two different landscape orientations and two different portrait orientations. Therefore, the tablet PC can be arranged in four different display orientations.

Figure 2:
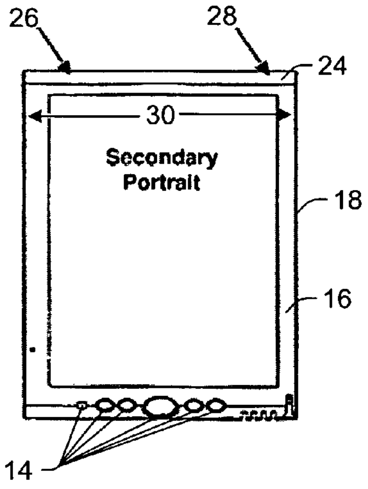
FIGS. 2-5 are schematic diagrams illustrating different orientations of a display of a portable system configured as a tablet personal computer (tablet PC)
Figure 3:
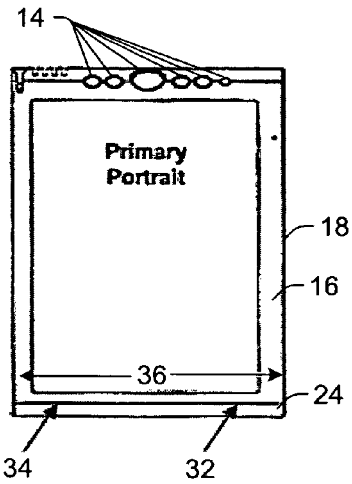
Figure 4:
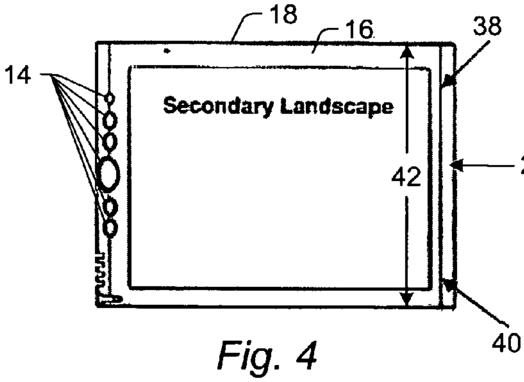
Figure 5:
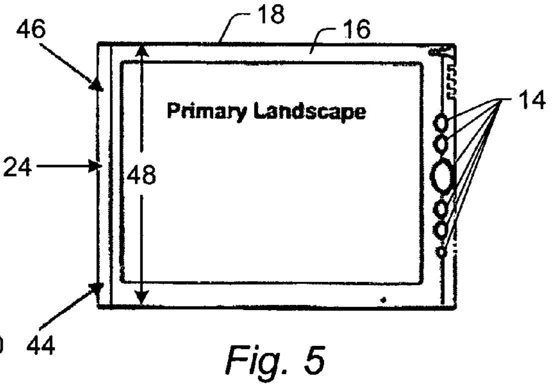

FIGS. 2-5 illustrate such different orientations for a tablet PC. For example, FIG. 2 illustrates a tablet PC in a secondary portrait orientation. FIG. 3 illustrates the tablet PC in a primary portrait orientation. FIG. 4 illustrates the tablet PC in a secondary landscape orientation, and FIG. 5 illustrates the tablet PC in a primary landscape orientation. As used herein, the terms "primary" and "secondary" are used to indicate different orientations and are not intended to indicate preferences for the display orientations or any other characteristics of the display orientations. It is noted that FIGS. 2-5 and other drawings presented herein are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

Determining the orientation of the display of the portable system may be performed in a number of ways. For example, as shown in optional step 12, the method may include receiving input entered manually by a user. The input may indicate a desired display orientation. The input may be entered by the user in a number of ways including, but not limited to, selecting a display orientation by pressing a button on the portable system or by selecting a display orientation option from a pull down menu or another type of menu displayed on the portable system. For example, a number of buttons 14 are illustrated in FIG. 2. Buttons 14 are located upon housing 16 of portable system 18, which in this example is illustrated as a tablet PC. One of the buttons may be designated for display orientation selection. In this manner, the user may press the button one or more times until the desired display orientation has been selected. Upon receipt of such input by a user, the computer-implemented method may be performed by the portable system. In this manner, the portable system may perform the computer-implemented method automatically upon detection of receipt of user input.

The orientation of the display may be determined in step 10 from the user input. For example, upon selecting a display orientation by pressing one of buttons 14, a signal may be sent from circuitry coupled to the buttons to a processor (not shown in FIG. 1 or 2) or another device. The signal may be used by the processor to determine the selected orientation of the display. The processor may then send a signal indicating the selected orientation to a display controller (not shown in FIG. 1 or 2). The display controller may then alter the current display orientation to the selected orientation based on the signal from the processor.

In another example, as shown in optional step 20 shown in FIG. 1, the method may include detecting that the portable system has been placed into a docking station (not shown in FIG. 1 or 2). Docking stations are known in the art, and the type of docking station will vary depending on the type of portable system that is being used. Upon detecting that the system has been placed into a docking station, the computer-implemented method may be performed by the portable system. In this manner, the portable system may perform the computer-implemented method automatically upon detection of the portable system in the docking station.

In this example, the orientation of the display may be determined in step 10 by a signal received by the portable system from the docking station indicating the position of the portable system within the docking station. The docking station may have a variety of sensors, one or more of which will determine the presence of the portable system in the docking station. These sensors or another one or more sensors of the docking station may determine the position of the portable system in the docking station. Alternatively, the portable system may include one or all of the sensors described above. A signal produced by the sensor(s) may be used by the portable system to determine the display orientation. For example, a signal generated by the sensor(s) may be provided to a processor or device (not shown in FIG. 1 or 2) of the portable system that is configured to carry out the computer-implemented method. The signal may be used by the processor or device to determine the position of the system in the docking station and therefore an orientation of the display.

In addition, any other method or device may be used to determine an orientation of a display of a portable system in step 10 of FIG. 1. For example, the portable system may include an orientation detector (not shown). The orientation detector may include a tilt sensor such as an accelerometer. The orientation detector may be configured to determine whether the portable system, and therefore the display, is in a landscape orientation or a portrait orientation and in which landscape or portrait orientation (e.g., primary or secondary). A signal indicative of the detected portable system orientation may be output from the orientation detector to the display controller. The display controller may then alter the display orientation accordingly. Upon detection that a signal indicating a different display orientation has been received, the portable system may perform the computer-implemented method automatically.

The method also includes altering an orientation of two speakers arranged along one side of the system based on the orientation of the display, as shown in step 22 of FIG. 1. Preferably, the two speakers are internal speakers of the system. "Internal speakers" are defined herein as speakers that are internal to a housing of a portable system. The internal speakers are preferably stereo speakers, as opposed to mono speakers, and the stereo speakers may include any stereo speakers known in the art that are suitable for portable or movable systems. In contrast, "external speakers" are defined herein as speakers that are not internal to a housing of a portable system, but instead can be coupled to the portable system by an output device of the portable system. One example of external speakers is a headphone set, which includes wiring connecting speakers to a connector. The connector can be used to couple the headphones to a jack in the portable system. Preferably, the speakers that are altered in orientation do not include such external speakers. In this manner, an orientation of the external speakers remains unchanged regardless of the orientation of the display. Such constant orientation of the external speakers may be suitable since the position of the external speakers may be unchanged with respect to a user regardless of the orientation of the display.

Altering the orientation of the speakers may include switching the left and right orientations of the two speakers such that the orientation of the two speakers provides a correct stereo base for the orientation of the display. For example, as shown in FIG. 2, portable system 18 may include speaker channel 24 formed in housing 16. Speaker channel 24 may include left channel 26 and right channel 28. The left audio signal may be provided to the speaker (not shown in FIG. 2) located in left channel 26, and the right audio signal may be provided to the speaker (also not shown in FIG. 2) located in right channel 28. In this configuration, the speakers provide the audio signals in a correct orientation along stereo base 30 for the secondary portrait orientation of the display.

However, if the display orientation is switched from the secondary portrait orientation to the primary portrait orientation shown in FIG. 3, and if the orientation of the speakers is not switched, then the right audio signal provided to the speaker in the right channel will be directed to the left side of the user, and the left audio signal provided to the speaker in the left channel will be directed to the right side of the user. In this manner, the speaker base will be reversed, and the sound experience provided to the user will be severely diminished.

In order to correct the sound provided to the user in the primary portrait orientation, the audio signals provided to the speakers in the left and right channels may be switched. In this manner, left channel 26 shown in FIG. 2 will become right channel 32 shown in FIG. 3, and right channel 28 shown in FIG. 2 will become left channel 34 shown in FIG. 3. As such, the left and right orientations of the two speakers are switched such that the orientation of the two speakers provides stereo base 36 corrected for the different portrait orientation of the display shown in FIG. 3. As a result, the sound provided to the user will be stereophonically correct regardless of the orientation of the display, and the user will have a consistent audio experience irregardless of the screen or display orientation.

The orientation of the speakers may also be altered for different landscape orientations. For example, the secondary landscape orientation shown in FIG. 4 includes speaker channel 24 with one speaker (not shown) located in right channel 38 and another speaker (not shown) located in left channel 40. The right audio signal is provided to the speaker located in right channel 38, and the left audio signal is provided to the speaker located in left channel 40. In this configuration, the speakers provide the audio signals in a correct orientation along stereo base 42 for the secondary landscape orientation of the display.

This orientation of the speakers is the same as that shown in FIG. 3. Therefore, if the display is switched between the primary portrait orientation and the secondary landscape orientation, then the orientation of the speakers does not need to be altered for such display orientation changes. However, if the display is switched between the secondary portrait orientation and the secondary landscape orientation, then the orientation of the speakers should be changed to provide a correct stereo signal to the user. The orientation of the speakers may be switched as described above.

In addition, if the display orientation is switched from the secondary landscape orientation shown in FIG. 4 to the primary landscape orientation shown in FIG. 5, and if the orientation of the speakers is not switched from that of the secondary landscape orientation, then the audio signals will not be provided to the correct sides of the user. In this manner, the speaker base will be reversed, and the quality of the sound provided to the user will be severely diminished.

To correct the sound provided to the user in the primary landscape orientation, the audio signals provided to the speakers in the left and right channels may be switched. In this manner, right channel 38 shown in FIG. 4 will be switched to the opposite side of the speaker channel as shown in FIG. 5, and left channel 40 shown in FIG. 4 will also be switched to the opposite side of the speaker channel as shown in FIG. 5. As such, the left and right orientations of the two speakers are switched such that right channel 38 shown in FIG. 4 will become left channel 44 shown in FIG. 5, and left channel 40 shown in FIG. 4 will become right channel 46 shown in FIG. 5. In this manner, the orientation of the two speakers provides stereo base 48 corrected for the different landscape orientation of the display shown in FIG. 5. As a result, the sound provided to the user will be stereophonically correct for this orientation of the display.

The orientation of the speakers shown in FIG. 5 is the same as that shown in FIG. 3. Therefore, if the display is switched between the primary portrait orientation and the primary landscape orientation, the orientation of the speakers does not need to be altered for such display orientation changes. However, if the display is switched between the secondary portrait orientation and the primary landscape orientation or between the secondary landscape orientation and the primary landscape orientation, then the orientation of the speakers should be changed as described above to provide a correct stereo signal to the user.

Although the speakers are arranged along the shorter side of the portable system as shown in FIGS. 2-5, it is to be understood that the speakers may alternatively be arranged along the longer side of the portable system. In such a speaker configuration, the orientation of the speakers may be altered based on the orientation of the display as described herein. In addition, it is to be understood that although one speaker is included in both the right and left channels as described above, more than one speaker may be included in each of the right and left channels.

Furthermore, the portable system may include speakers on the front side of the system (e.g., the side of the system on which a display is located) as well as the rear side of the system (i.e., the side of the system opposite the front side). In such embodiments, the methods described herein may include altering the orientation of the front and rear speakers based on the orientation of a user. For example, the methods may include detecting the user orientation and altering the front and rear speaker orientation automatically or manually based on the user orientation. In particular, if the user is facing the front side of the system, the front speakers may be used to deliver sound. In addition, if the user is facing the rear side of the system, the rear speakers may be used to deliver sound to the user. Preferably, the front and rear speakers are internal, stereo speakers.

In addition, although the portable system is shown in FIGS. 2-5 to include only two internal stereo speakers, it is to be understood that the portable system may include more than two internal speakers even though keeping the number of speakers in a system to a minimum may keep the size and weight of the system to a minimum. For example, the portable system may include three or more speakers, each of which is spatially separated from each other and located in a different section of a speaker channel. The three or more speakers may be arranged along two sides of the portable system. For example, the system may include three or four speakers, and each of the speakers may be arranged in one corner of the housing of the portable system. If the portable system includes three or more speakers, the computer-implemented methods described herein may include altering the orientation for each of the three or more speakers. Altering the orientation of the three or more speakers may be performed as described herein. The computer-implemented method shown in FIG. 1 may also include additional steps described herein.

Figure 6:
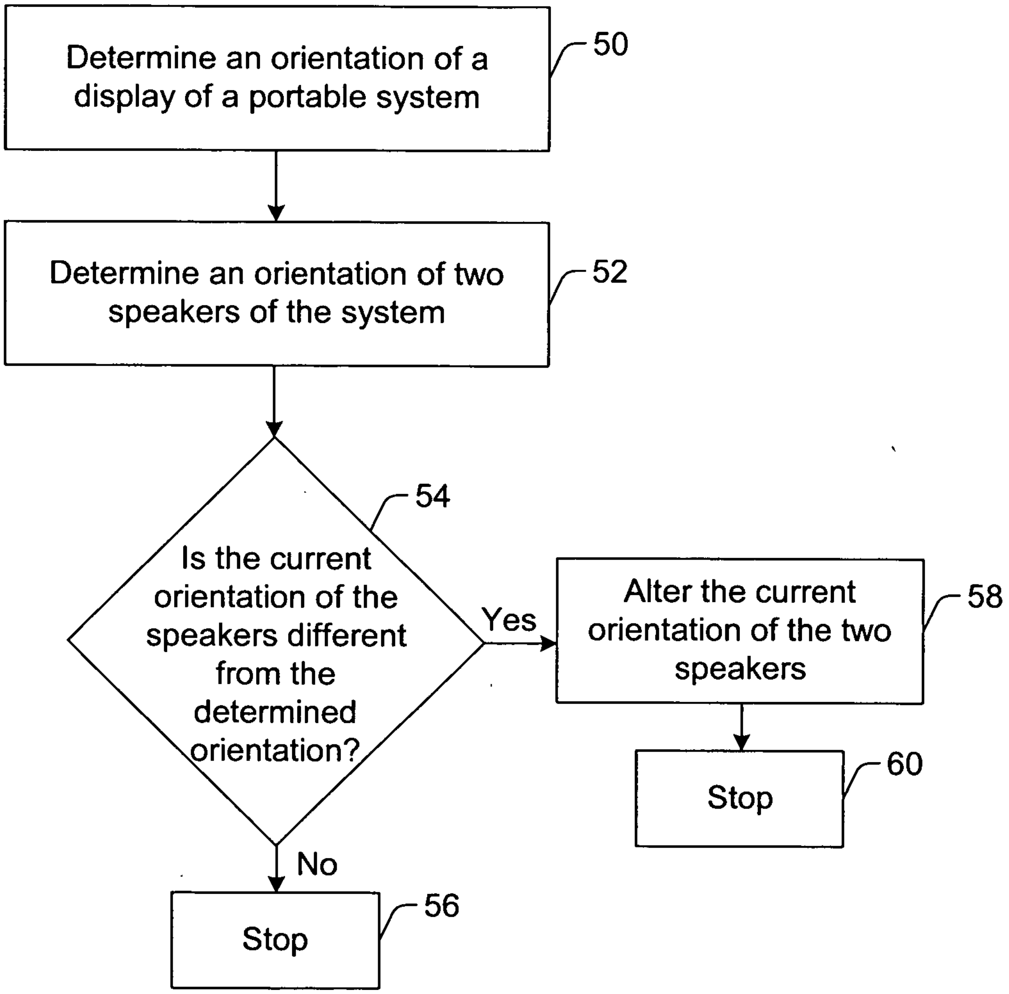
FIG. 6 is a flow chart illustrating another embodiment of a computer-implemented method.

FIG. 6 illustrates a flow chart of another computer-implemented method embodiment. In this embodiment, the method includes determining an orientation of a display of a portable system, as shown in step 50. Determining the orientation of the display may be performed as described above. The portable system may be configured as described herein. The method also includes determining an orientation of two speakers of the system based on the orientation of the display, as shown in step 52. Determining the orientation of the two speakers may be performed as described above. In addition, the two speakers may be configured as described above. For example, the two speakers are arranged along one side of the portable system. In addition, the two speakers are preferably internal, stereo speakers of the system.

The method also includes determining if the current orientation of the two speakers differs from the determined orientation of the two speakers, as shown in step 54. If the current orientation of the speakers is not different than the determined orientation of the two speakers, then the method is stopped as shown in step 56 since the current orientation of the speakers is the correct orientation for the orientation of the display. If the current orientation of the speakers is different than the determined orientation of the two speakers, then the method includes altering the current orientation of the two speakers as shown in step 58 such that the two speakers have the determined orientation. The determined orientation of the two speakers preferably corresponds to a correct stereo base for the orientation of the display. In this manner, after the orientation of the two speakers is altered, the two speakers will have the correct orientation for the orientation of the display and will provide a correct stereo signal to a user of the portable system. After performing step 58, the method may be stopped as shown in step 60.

Since the two speakers that are altered in orientation (if necessary) are not external speakers of the system, an orientation of the external speakers remains unchanged regardless of the orientation of the display. The external speakers may be configured as described herein. In addition, although two speakers for the portable system may be preferable as described above, it is to be understood that the portable system may include three or more speakers. The three or more speakers may be configured as described above. In such embodiments, the method shown in FIG. 6 may include determining the orientation of each of the three or more speakers based on the orientation of the display. In addition, the method may include altering the orientation of each of the three or more speakers. The orientation of each of the three or more speakers may be altered as described above. As also described above, each of the methods shown in FIGS. 1 and 6 may be performed automatically. However, these computer-implemented methods may alternatively be performed manually.

Figure 7A:
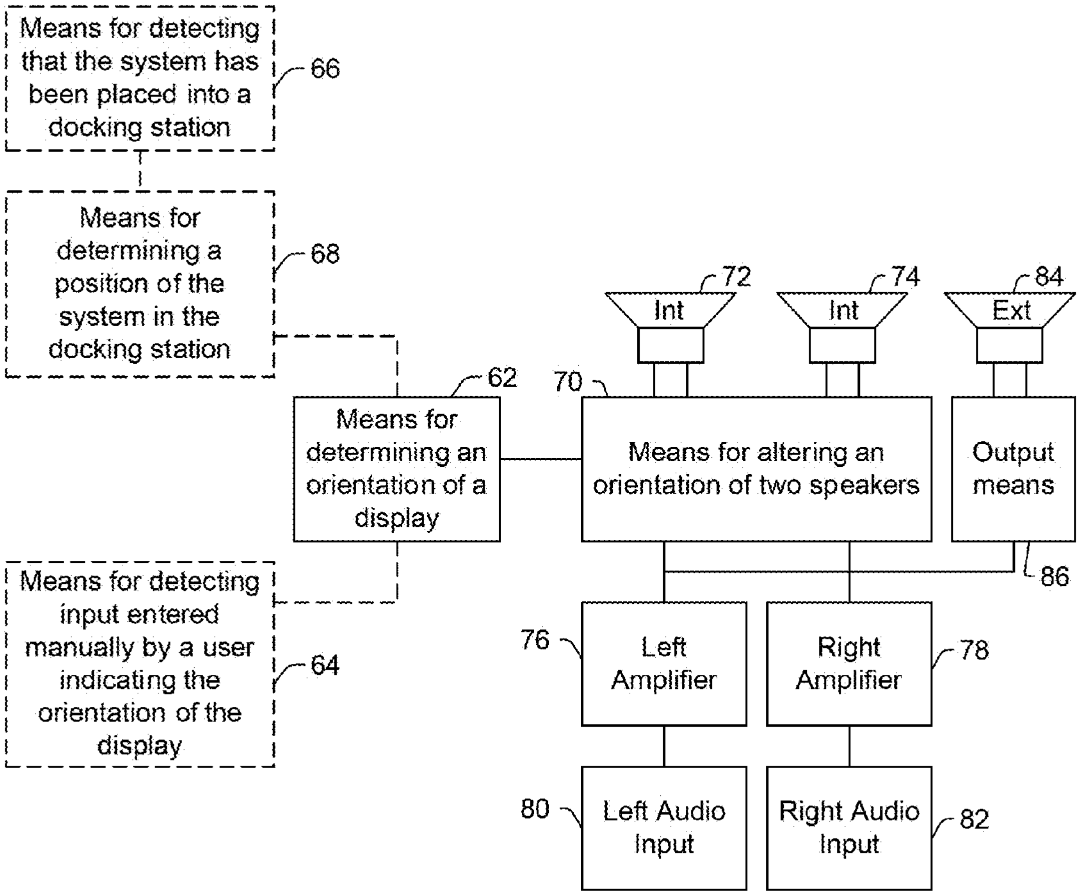
FIGS. 7-8 are block diagrams illustrating different embodiments of a portion of a portable system.
Figure 7B:
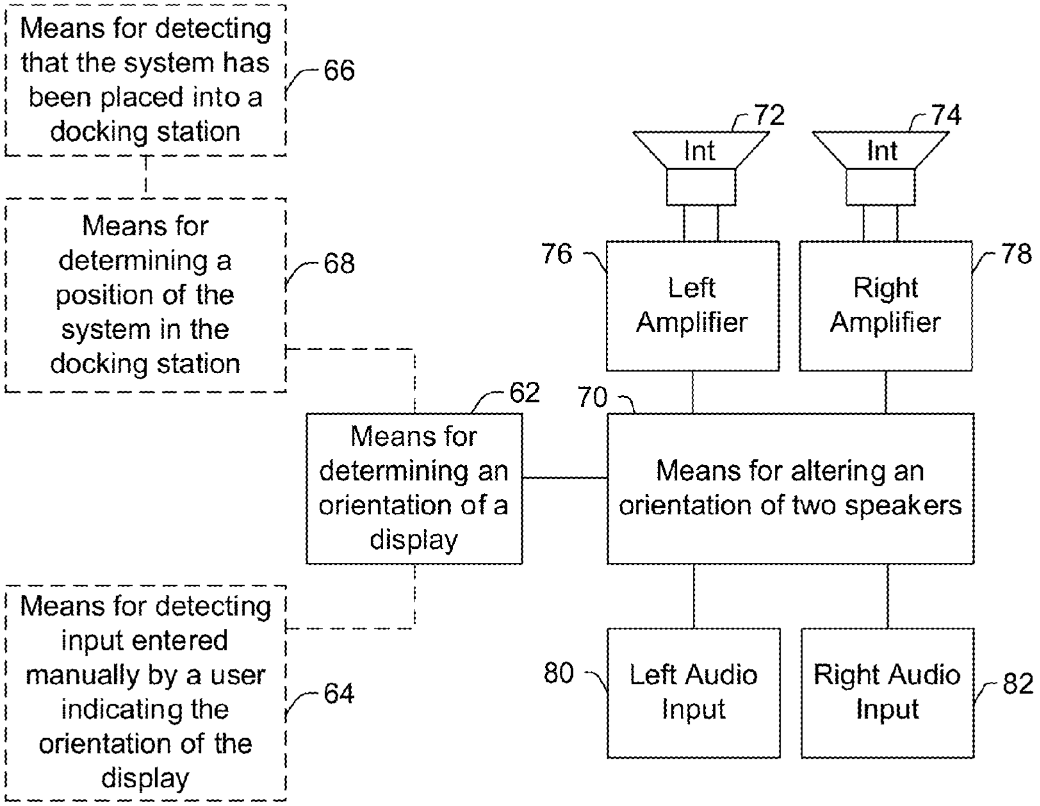

FIGS. 7A-B are block diagram illustrating embodiments of a portion of a portable system. In one embodiment, the portable system may be a tablet PC. The portion of the portable systems shown in FIGS. 7A-B may be included in one of the tablet PCs illustrated in FIGS. 2-5. However, the portion of the portable system may be included in any other portable system known in the art.

The portable system includes means 62 for determining an orientation of a display of the portable system. In this embodiment, means 62 for determining the orientation of the display may include a number of different devices including, for example, one or more logic gates, a multiplexer or another selection device, or multiple switches. In addition, means 62 may include any other appropriate device or devices known in the art.

In some embodiments, means 62 may include means 64 for detecting input entered manually by a user of the portable system indicating the orientation of the display. Means 64 for detecting input entered manually by the user may include one or more switches (not shown) and/or any other appropriate device(s) known in the art for allowing the user to select a display orientation. The switch may be activated by means of a button (such as one of buttons 14 shown in FIGS. 2-5) on the portable system. The user may press the button one or more times until the desired display orientation has been selected. Alternatively, the switch may be activated by another selection means such as a pull down menu or another type of menu displayed on the portable device. Upon receipt of such input by the user, the portable system may perform one of the computer-implemented methods described herein. In this manner, the portable system may perform a computer-implemented method automatically upon detection of receipt of the user input.

Means 64 may also generate a signal that indicates the display orientation selected by the user. This signal may be used by means 62 to determine the selected display orientation. Means 62 may then send a signal indicating the selected orientation to means for controlling the display (not shown in FIG. 7) of the portable system. The means for controlling the display may then alter the current display orientation to the selected orientation based on the signal from means 62. Alternatively, means 64 may be coupled to the means for controlling the display of the portable system. The output of means 64 may be used by the means for controlling the display of the portable system to alter the orientation of the display. The means for controlling the display may include any appropriate display controller known in the art.

In other embodiments, means 62 may includes means 66 for detecting that the system has been placed into a docking station (not shown in FIG. 7). Docking stations are known in the art, and the type of docking station will vary depending on the type of portable system that is being used. Means 66 may include one or more sensors (not shown) incorporated in the docking station and/or one or more sensors (not shown) incorporated in the portable system. The sensor(s) may include any appropriate sensor(s) known in the art. The sensor(s) may generate one or more signals that indicate that the portable system has been placed in the docking station. Upon detection of the signal(s) by means 62, the portable system may perform one of the computer-implemented methods described herein. In this manner, the portable system may perform the computer-implemented methods automatically upon detection that the system has been placed into a docking station.

Means 62 may also include means 68 for determining a position of the portable system in the docking station. Means 68 may include one or more sensors (not shown). For example, means 68 may share the sensor(s) of means 66. For example, the same sensor(s) may detect the presence of the portable system in the docking station as well as determine a position of the portable system with respect to the docking station. Alternatively, means 68 may include one or more additional sensors incorporated in the docking station and/or one or more additional sensors incorporated in the portable system. The sensor(s) of means 68 may also include any appropriate sensor(s) known in the art. The sensor(s) of means 68 generate one or more signals that indicate the position of the portable system in the docking station. Means 62 may then use the signal(s) generated by the sensor(s) of means 68 to determine the orientation of the display of the portable system. The signal(s) generated by the sensor(s) of means 68 may be provided to means for controlling the display of the portable system (not shown) directly or indirectly (e.g., through means 62). The signal(s) may be used by the means for controlling the display of the portable system to alter the display orientation of the portable system.

Means 62 may alternatively include any other means for determining an orientation of a display of a portable system. For example, means 62 may include an orientation detector (not shown). The orientation detector may include a tilt sensor such as an accelerometer. The orientation detector may be configured to determine whether the portable system, and therefore the display device (not shown) of the portable system, is in a landscape orientation or a portrait orientation and in which landscape or portrait orientation (e.g., primary or secondary). A signal indicative of the detected portable system orientation may be output from the orientation detector to means for controlling the display of the portable system (not shown). The means for controlling the display may then alter the display orientation accordingly. Upon detection that a signal indicating a different display orientation has been received by means 62, the portable system may perform one of the computer-implemented methods described herein automatically.

The portable system also includes means 70 for altering an orientation of two speakers 72 and 74 arranged along one side of the portable system based on the orientation of the display. Speakers 72 and 74 may be arranged along one side of the portable system as shown in FIGS. 2-5. Speakers 72 and 74 are preferably internal speakers of the system. In other words, speakers 72 and 74 are arranged within a portable system housing such as portable system housing 16 shown in FIGS. 2-5. In addition, speakers 72 and 74 are preferably stereophonic speakers.

Means 70 is coupled to means 62. Means 62 sends a signal indicating the orientation of the display to means 70. Means 70 is preferably a switch. In the embodiment of FIG. 7A, means 70 couples speakers 72 and 74 to left amplifier 76 and right amplifier 78. The system includes left audio input 80 and right audio input 82 coupled to left amplifier 76 and right amplifier 78, respectively. In the embodiment of FIG. 7A, left audio input 80 is provided to left amplifier 76 regardless of the display orientation, and right audio input 82 is provided to right amplifier 78 regardless of the display orientation.

However, depending on the orientation of the display, means 70 may alter which amplifier is coupled to which speaker. For example, if the display orientation is switched between the secondary portrait orientation and the primary portrait orientation (or between the secondary landscape orientation and the primary landscape orientation), which are described further above, means 70 may switch the coupling of the amplifiers to the speakers such that the speaker that was coupled to the left amplifier is now coupled to the right amplifier and vice versa. In this manner, means 70, in combination with the other means described herein, may alter the orientation of the two speakers based on the orientation of the display to provide a correct stereo base for the display orientation. As such, the speakers may provide a correct stereo image to the user regardless of the orientation of the display and the portable system.

In an alternative embodiment, means 70 may couple left audio input 80 and right audio input 82 to left amplifier 76 and right amplifier 78, as shown in FIG. 7B. In such an embodiment, depending on the orientation of the display, means 70 may alter which audio output is coupled to which amplifier. In this embodiment, unlike the embodiments described above in FIG. 7A, left amplifier 76 is coupled to speaker 72 regardless of the orientation of the display, and right amplifier is coupled to speaker 74 regardless of the orientation of the display (or vice versa). However, means 70 may switch the coupling of the amplifiers to the audio outputs such that the amplifier that was coupled to the left audio output is now coupled to the right amplifier and vice versa. In this manner, like the embodiments described above means 70, in combination with the other means described herein, may alter the orientation of the two speakers based on the orientation of the display to provide a correct stereo base for the display orientation. As such, the speakers may provide a correct stereo image to the user regardless of the orientation of the display and the portable system.

Speakers 72 and 74 are not external speakers of the system. The portable system, however, may also include external speaker 84. Although the portable system is shown in FIG. 7A to include only one external speaker, it is to be understood that the portable system may include more than one external speaker. External speaker 84 may be coupled to the portable system through output means 86. Output means 86 may be a headphone jack, a speaker jack, or any other output device to which a connector of the external speaker may be connected. Output means 86 is coupled to left amplifier 76 and right amplifier 78. The left and right amplifiers are configured to provide the left and right audio signals from left audio input 80 and right audio input 82 to the output means and thereby to the external speaker.

As shown in FIG. 7A, output means 86 is not coupled to the left and right amplifiers by means 70 or any other switch. Therefore, the orientation of the left and right audio signals to the external speaker remains fixed regardless of the orientation of the display or the portable system. As such, the orientation of the external speakers remains unchanged regardless of the orientation of the display. Such constant orientation of the external speakers is preferable since the position of the external speakers with respect to the user of the portable system will be unchanged regardless of the orientation of the display.

The portion of the portable systems shown in FIGS. 7A-B may be further configured as described herein. For example, the portable systems may include three or more internal speakers. In such an embodiment, means 70 may be configured to alter the orientation of each of the three or more speakers based on the orientation of the display. Altering the orientation of the three or more speakers may be performed as described herein. In addition, the three or more speakers may be configured as described herein. A portable system that includes the portions shown in FIGS. 7A-B may also be further configured as is known in the art. For example, such a portable system may also include other components such as, but not limited to, a display screen, a processor, and a storage medium.

In addition, the portion of the portable systems shown in FIGS. 7A-B may be further configured to carry out any of the computer-implemented methods described herein. For example, means 62 (or an additional means) may be configured to determine if a current orientation of the two speakers differs from the determined orientation of the two speakers. In addition, means 70 may be configured to alter the current orientation of the two speakers if the current orientation is different than the determined orientation such that the two speakers have the determined orientation.

Figure 8:
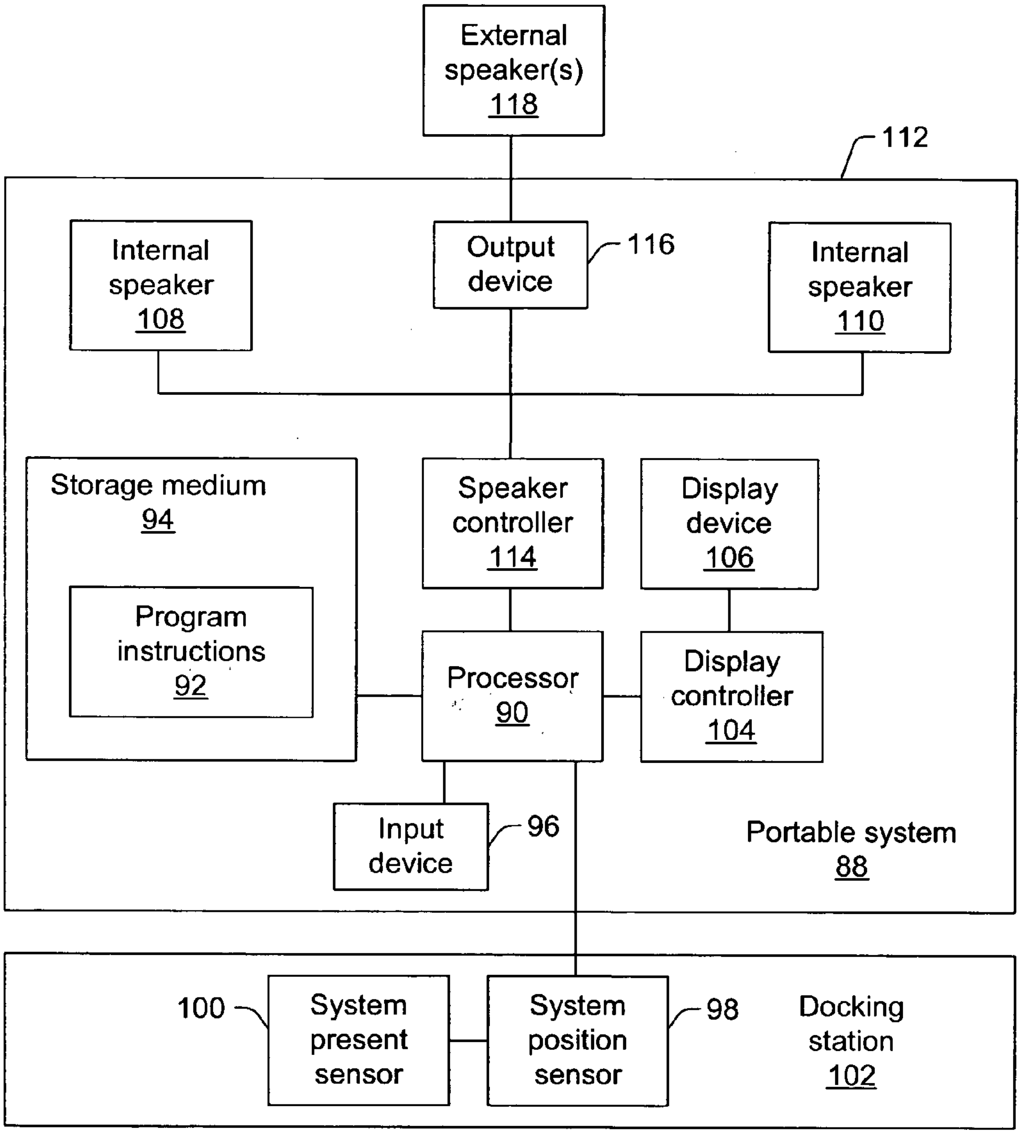

FIG. 8 illustrates another embodiment of a portion of portable system 88. In one embodiment, portable system 88 may be a tablet PC. In such an embodiment, the portion of the portable system shown in FIG. 8 may be further configured as one of the tablet PCs illustrated in FIGS. 2-5. Alternatively, the portion of the portable system may be included in any other portable system known in the art. In contrast to the device or hardware based systems shown in FIGS. 7A-B, FIG. 8 is largely a software based system as far as performing the computer-implemented methods described herein is concerned. For example, portable system 88 shown in FIG. 8 includes processor 90. Processor 90 is configured to execute program instructions 92 to perform a computer-implemented method according to the above embodiments. The processor may be any processor known in the art, which can execute instructions from a memory medium.

Program instructions 92 implementing methods such as those described herein may be transmitted over or stored on a carrier medium. The carrier medium may be a transmission medium (not shown) such as a wire, cable, or wireless transmission link, or a signal (not shown) traveling along such a wire, cable, or link. The carrier medium may also be storage medium 94.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), or other technologies or methodologies, as desired.

In particular, the program instructions may be executable on the processor to determine an orientation of a display of portable system 88. For example, program instructions 92 may be executable to use input from input device 96 to determine the orientation of the display of portable system 88. The input device may be configured to receive input entered manually by a user of the system. The input may indicate the orientation of the display. In one example, the input device may include one or more buttons on the portable system (such as one of buttons 14 shown in FIGS. 2-5). The input device, however, may include any suitable input device known in the art. Since the input indicates the desired display orientation of the user, the program instructions may be executable to determine the selected orientation of the display based on the input from the user.

In another example, program instructions 92 may be executable to use input from system position sensor 98 to determine the orientation of the display of portable system 88. System position sensor 98 may be coupled to system present sensor 100. As shown in FIG. 8, system position sensor 98 and system present sensor 100 are incorporated into docking station 102. However, system position sensor 98 and system present sensor 100 may alternatively be incorporated into portable system 88. In another embodiment, system present sensor 100 may be incorporated into docking station 102, and system position sensor 98 may be incorporated into portable system 88 (or vice versa). In some embodiments, system present sensor 100 may actually include one or more sensors incorporated in the docking station and/or one or more sensors incorporated in the portable system. Similarly, system position sensor 98 may include one or more sensors incorporated in the docking station and/or one or more sensors incorporated in the portable system. Docking station 102 may include any docking station known in the art and will vary depending on the configuration of portable system 88.

System present sensor 100 is configured to detect that the system has been placed into docking station 102. Upon detecting that the system is present in the docking station, system present sensor 100 may send a signal to system position sensor 98. Upon receiving the signal from system present sensor 100, system position sensor 98 may determine a position or orientation of the system in the docking station. In another embodiment, the system may include one sensor that is configured to detect both if the system is present in the docking station and the position of the portable system in the docking station. Such a sensor may be located in the docking station or in the portable system. The position or the orientation of the system in the docking station will determine the correct display orientation of the portable system. System position sensor 98 may generate a signal indicating the position of the system within the docking station. The program instructions may be executable on processor 90 to determine the orientation of the display using the signal from system position sensor 98.

As shown in FIG. 8, the portable system also includes display controller 104. Display controller 104 is coupled to processor 90. Program instructions 92 may be executable on processor 90 to indicate to the display controller a selected display orientation for display device 106. For example, program instruction 92 may instruct processor 90 to send a signal to the display controller that indicates the display orientation. Display controller 104 is coupled to display device 106. Display controller 104 configures data for display on display device 106, and may provide an interface between processor 90 and display device 106. The display controller may include any appropriate hardware or software known in the art. For example, the display controller may include any appropriate logic circuitry known in the art. In addition, although the display controller is shown in FIG. 8 to be separate from processor 90, it is to be understood that the display controller may be incorporated into the processor as logic circuitry. Alternatively, the display controller may be configured as program instructions and may be included in program instructions 92 or may be stored in storage medium 94 as additional program instructions. In such an embodiment, processor 90 may be coupled directly to display device 106 and may directly control the display device according to the program instructions.

Display device 106 is preferably a display screen, and may be formed within various devices, such as a portable monitor, laptop computer, tablet PC, telephone, pager, PDA, or another portable system. Such a display screen may be formed using various technologies, including liquid crystal display (LCD) technology, cathode ray tube (CRT) technology or projection technologies. Furthermore, display device 106 may be a display screen having one of many different sizes. Display controller 104 is adapted to send an appropriate amount of data to display device 106, an amount which may vary depending on the size of the display.

Program instructions 92 may also be executable on processor 90 to alter an orientation of two speakers 108 and 110 arranged along one side 112 of portable system 88 based on the orientation of the display. Speakers 108 and 110 are preferably internal speakers of the system. In other words, speakers 72 and 74 are arranged within the portable system, as shown in FIG. 8. In addition, speakers 108 and 110 are preferably stereophonic speakers. The program instructions for altering an orientation of the two speakers may be included in one set of program instructions along with the program instructions for determining an orientation of the display. Alternatively, the program instructions for altering the orientation of the two speakers and the program instructions for determining an orientation of the display may be different sets of program instructions, both of which may be stored on storage medium 94.

As shown in FIG. 8, the portable system includes speaker controller 114. Speaker controller 114 is coupled to processor 90. Program instructions 92 may be executable on processor 90 to indicate to the speaker controller a speaker orientation for speakers 108 and 110. For example, program instruction 92 may instruct processor 90 to send a signal to the speaker controller that indicates the correct speaker orientation. Speaker controller 114 is coupled to speakers 108 and 110. Speaker controller 114 configures audio signals for speakers 108 and 110, and may provide an interface between processor 90 and speakers 108 and 110. In addition, speaker controller 114 may provide an interface between left and right amplifiers (not shown) and speakers 108 and 110. The left and right amplifiers may be configured as described above. The system also includes left audio input (not shown) and right audio input (not shown) coupled to the left and right amplifiers, respectively. The left audio input is provided to the left amplifier regardless of the display orientation, and the right audio input is provided to the right amplifier regardless of the display orientation.

The speaker controller may include any appropriate hardware and/or software known in the art. For example, the speaker controller preferably includes a switch and may also include appropriate logic circuitry. For example, the speaker controller preferably includes a switch that couples speakers 108 and 110 to the left amplifier and the right amplifier. In addition, although the speaker controller is shown in FIG. 8 to be separate from processor 90, it is to be understood the speaker controller may be incorporated into the processor as a switch and in some cases logic circuitry coupled to the switch. Alternatively, a portion of the speaker controller may be configured as program instructions and may be included in program instructions 92 or other program instructions stored on storage medium 94. In such an embodiment, if the switch of the speaker controller is incorporated into processor 90, processor 90 may be directly coupled to speakers 108 and 110 and may directly control the speakers and the speaker orientation according to the program instructions.

Depending on the orientation of the display, program instructions 92 executable on processor 90, in conjunction with speaker controller 114, may alter which amplifier is coupled to which speaker. For example, if the display orientation is switched between the secondary portrait orientation and the primary portrait orientation (or between the secondary landscape orientation and the primary landscape orientation), which are described further above, program instructions through the use of the speaker controller may switch the coupling of the amplifiers to the speakers such that the speaker that was coupled to the left amplifier is now coupled to the right amplifier and vice versa. In this manner, the program instructions may alter the orientation of the two speakers based on the orientation of the display to provide a correct stereo base for the orientation of the display. As such, speakers 108 and 110 may provide a correct stereo image to the user regardless of the orientation of the display and the portable system.

As shown in FIG. 8, speaker controller 114 is also coupled to output device 116. Speaker controller 114 may provide an interface between the left and right amplifiers and the output device. Output device 116 may be coupled to external speaker (s) 118. The output device and the external speaker(s) may be configured as described herein. For example, in one embodiment, the output device may be a headphone jack, and the external speakers may be speakers of a headphone set. Preferably, the orientation of the external speakers remains unchanged regardless of the orientation of the display for reasons described further above. Therefore, the output device is preferably not coupled to the switch of the speaker controller such that the orientation of the external speakers remains unchanged. In another embodiment, output device 116 may be coupled directly to the left and right amplifiers, as shown in FIG. 7A.

The portable system shown in FIG. 8 may be further configured as described herein. For example, portable system 88 may include three or more internal speakers. In such an embodiment, program instructions 92 may be executable to alter the orientation of each of the three or more speakers based on the orientation of the display. Altering the orientation of the three or more speakers may be performed as described herein. In addition, the three or more speakers may be configured as described herein. The embodiment of the portable system shown in FIG. 8 may also be further configured as is known in the art.

In addition, the portion of the portable system shown in FIG. 8 may be further configured to carry out any of the computer-implemented methods described herein. For example, program instructions 92 may be further executable to determine if a current orientation of the two speakers differs from the determined orientation of the two speakers. The program instructions may also be executable to alter the current orientation of the two speakers only if the current orientation is different than the determined orientation such that the two speakers have the determined orientation.

Further modifications and alternative embodiments of various aspects of the invention may be apparent to those skilled in the art in view of this description. For example, methods and systems for altering the speaker orientation of a portable system based on the display orientation of the system are provided. Accordingly, this description is to be construed as illustrative only and is for the purpose of teaching those skilled in the art the general manner of carrying out the invention.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method comprising program instructions stored on a carrier medium, the method comprising:

first program instructions executable by a processor for determining an orientation of a display of a portable system having a maximum of two speakers; and second program instructions executable by the processor for altering an orientation of the two speakers arranged along one side of the system based on the orientation of the display, wherein the orientation of the two speakers is altered by swapping audio signals supplied to the two speakers when the orientation of the display is rotated clockwise 90° from a portrait orientation to a landscape orientation or counter-clockwise 90° from the landscape orientation to the portrait orientation.

2. The method of claim 1, wherein the two speakers are internal speakers of the portable system.

3. The method of claim 1, wherein the two speakers are not external speakers of the portable system, and wherein an orientation of the external speakers remains unchanged regardless of the orientation of the display.

4. The method of claim 1, wherein the portable system performs the computer-implemented method automatically.

5. The method of claim 1, wherein the portable system performs the computer-implemented method upon receipt of input entered manually by a user.

6. The method of claim 1, wherein the portable system performs the computer-implemented method upon detecting that the portable system has been placed into a docking station.

7. The method of claim 1, wherein the orientation of the two speakers maintains a correct stereo base for the orientation of the display.

8. The method of claim 1, wherein the portable system comprises a tablet personal computer.

9. The method of claim 1, wherein the orientation of the two speakers is altered by swapping audio signals supplied to the two speakers when the orientation of the display is rotated 180°.

10. The method of claim 1, wherein the orientation of the two speakers is not altered when the orientation of the display is rotated counter-clockwise 90° from a portrait orientation to a landscape orientation or clockwise 90° from a landscape orientation to a portrait orientation.

11. A computer-implemented method comprising program instructions stored on a carrier medium, the method comprising:

first program instructions executable by a processor for determining an orientation of a display of a portable system having a maximum of two speakers, wherein the two speakers are arranged along one side of the portable system;

second program instructions executable by the processor for determining an orientation of the two speakers of the system based on the orientation of the display; and third program instructions executable by the processor for determining if a current orientation of the two speakers differs from the determined orientation of the two speakers, and if so, altering the current orientation of the two speakers such that the two speakers have the determined orientation, wherein said altering comprises swapping audio signals supplied to the two speakers when the orientation of the display is rotated clockwise 90° from a portrait mode to a landscape mode or counter-clockwise 90° from the landscape mode to the portrait mode.

12. The method of claim 11, wherein the determined orientation of the two speakers corresponds to a correct stereo base for the orientation of the display.

13. The method of claim 11, wherein the two speakers are internal speakers of the portable system.

14. The method of claim 11, wherein the two speakers are not external speakers of the portable system, and wherein an orientation of the external speakers remains unchanged regardless of the orientation of the display.

15. The method of claim 11, wherein the orientation of the two speakers is altered by swapping audio signals supplied to the two speakers when the orientation of the display is rotated 180°.

16. The method of claim 11, wherein the orientation of the two speakers is not altered when the orientation of the display is rotated counter-clockwise 90° from a portrait orientation to a landscape orientation or clockwise 90° from a landscape orientation to a portrait orientation.

17. A portable system, comprising:

means for determining an orientation of a display of the portable system having a maximum of two speakers arranged along one side of the portable system; and means for altering an orientation of the two speakers arranged along one side of the portable system based on the orientation of the display, wherein said altering comprises swapping audio signals supplied to the two speakers when the orientation of the display is rotated clockwise 90° from a portrait orientation to a landscape orientation or counter-clockwise from the landscape orientation to the portrait orientation.

18. The portable system of claim 17, wherein the orientation of the two speakers provides a correct stereo base for the orientation of the display.

19. The portable system of claim 17, wherein the two speakers are not external speakers of the portable system, and wherein an orientation of the external speakers remains unchanged regardless of the orientation of the display.

20. The portable system of claim 17, wherein the means for determining the orientation of the display comprises means for detecting input entered manually by a user indicating the orientation of the display.

21. The portable system of claim 17, wherein the means for determining the orientation of the display comprises means for detecting that the portable system has been placed into a docking station and means for determining a position of the portable system in the docking station.

22. The portable system of claim 17, wherein the portable system comprises a tablet personal computer.

23. The portable system of claim 17, wherein the portable system further comprises:

left and right audio inputs for generating left and right audio signals; and left and right amplifiers for amplifying the left and right audio signals.

24. The portable system of claim 23, wherein the left audio input is coupled to the left amplifier, wherein the right audio input is coupled to the right amplifier, and wherein the means for altering the orientation of the two speakers is coupled between the amplifiers and the speakers for altering which amplifier is coupled to which speaker.

25. The portable system of claim 23, wherein the left amplifier is coupled to a first one of the two speakers, wherein the right amplifier is coupled to a second one of the two speakers, and wherein the means for altering the orientation of the two speakers is coupled between the amplifiers and the audio inputs for altering which audio input is coupled to which amplifier.

26. The portable system of claim 17, wherein the orientation of the two speakers is altered by swapping audio signals supplied to the two speakers when the orientation of the display is rotated 180°.

27. The portable system of claim 17, wherein the orientation of the two speakers is not altered when the orientation of the display is rotated counter-clockwise 90° from a portrait orientation to a landscape orientation or clockwise 90° from a landscape orientation to a portrait orientation.

28. The portable system of claim 17, wherein the two speakers arranged along one side of the portable system are located on the front of the portable system, wherein the portable system further comprises:

two additional speakers located on the back of the portable system;

means for detecting an orientation of a user of the portable system; and means for altering an orientation of the front and back speakers based on the orientation of the user.

* * * * *

UNITED STATES PATENT AND TRADEMARK OFFICE

CERTIFICATE OF CORRECTION

PATENT NO. : 8,600,084 B1
APPLICATION NO. : 10/984334
DATED : December 3, 2013
INVENTOR(S) : Garrett It is certified that error appears in the above-identified patent and that said Letters Patent is hereby corrected as shown below:

IN THE CLAIMS:

Claim 17, col. 17, line 24: after the word "counter-clockwise" insert --90°--.

Signed and Sealed this
Eleventh Day of March, 2014

Michelle K. Lee

Michelle K. Lee
*Deputy Director of the United States Patent and Trademark Office*